United States Patent Office 2,876,370
Patented Mar. 3, 1959

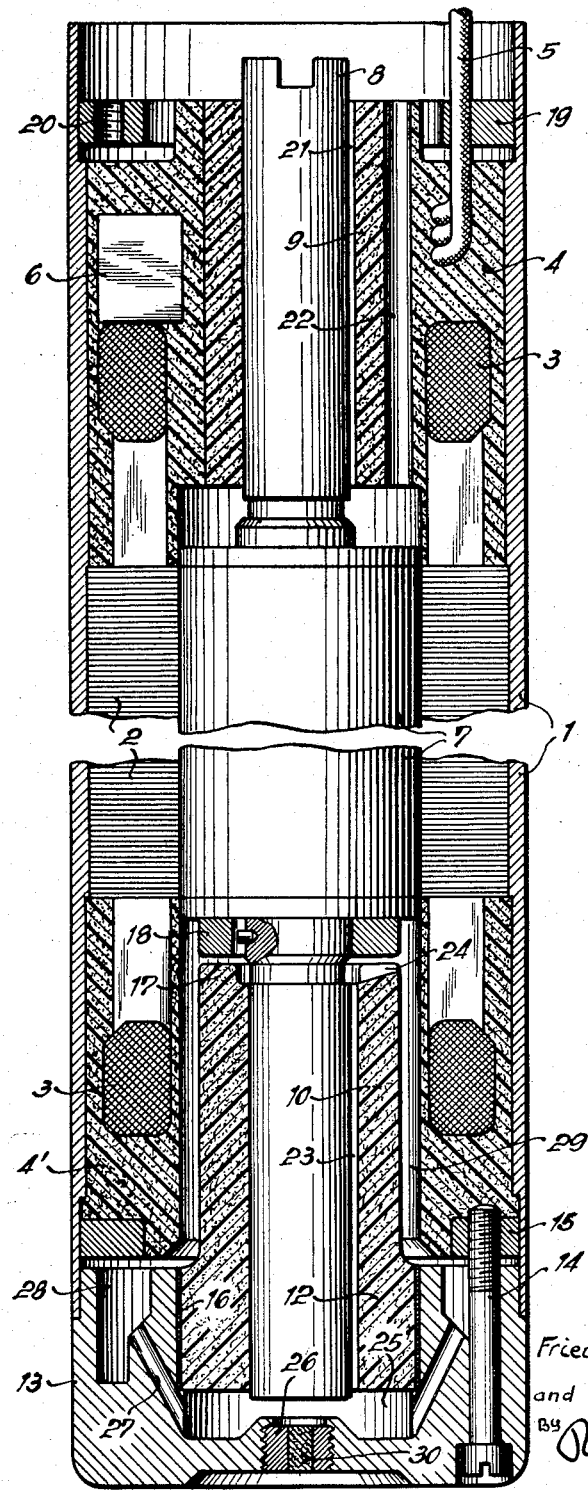

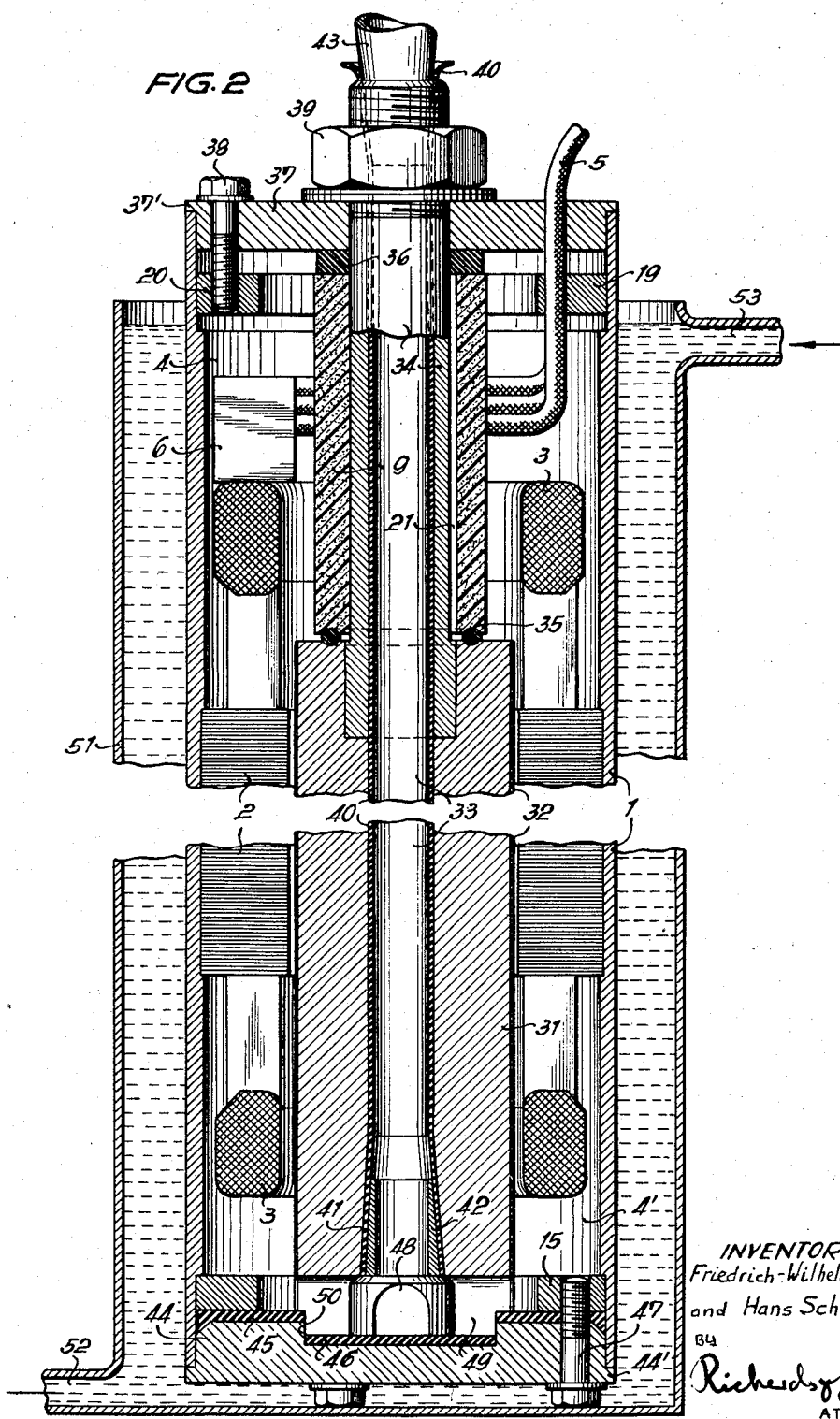

2,876,370

SUBMERSIBLE ELECTRIC MOTOR

Friedrich W. Pleuger and Hans Schneider, Hamburg, Germany, assignors to Pleuger & Co., Hamburg-Wandsbek, Germany, a firm Application January 24, 1955, Serial No. 483,652

Claims priority, application Germany January 29, 1954

2 Claims. (Cl. 310—87)

Our invention relates to improvements in submersible electric motors and more particularly to submersible electric motors driving deep well pumps.

Since submersible electric motors of the squirrel cage type, which are filled with water circulating within the motor casing, are widely used, especially for driving deep well pumps, it is of general importance to provide the stator windings of such motors with a liquid-proof insulation. For this purpose materials such as rubber or plastic materials composed essentially of polyvinyl chloride or polyethylene have been generally used with good success. The use of these materials in manufacturing such articles is, however, limited to making insulations of a certain thickness. Besides, insulations made of these materials are required to have a certain thickness so as to guarantee proper protection of the wires. Insulations of said minimum thickness are not adapted for submersible electric motors employed in narrow bore holes of diameters of e. g. approximately 4 inches, since its use makes it impossible to insert the number of wires required into the stator grooves, espectially when the motor is intended to work with a 220, 380 or 500 volts line voltage. In order to adapt submersible electric motors for operation with these line voltages it has been necessary to provide a transformer reducing these voltages, which results in an increase of production and maintenance costs of the motor and pumping unit.

There have been attempts to imbed the stator windings of submersible electric motors in an insulating substance, such as a rubberlike or plastic material. This method has failed owing to the high temperature required to fill the stator with the insulating substance, which produce a considerable shrinkage of the insulating substance and, along therewith, cracks in the metal parts surrounding the windings. When rubberlike substances are used the shrinkage is caused by their high vulcanizing temperatures. Furthermore, the insulating substances known in the art become brittle with increasing age or begin to admit water, finally causing failure or breakdown of insulation. For this reason, methods as described above were not found to be practical.

It is one object of the invention to provide a simple, reliable and non-corrosive construction of a submersible electric motor, especially a motor of small external diameter, having low manufacturing and maintenance costs and adapted to operate with high voltages, and to avoid failures of the above described type. In consequence thereof, it is a more particular object of the invention to provide windings of the sumbersible electric motor of small external diameter equal to the windings of ordinary electric motors and to protect these windings against injuries from the water circulating within the motor casing.

It is a further object of the invention to provide the bearings of the motor shaft of a plastic material having smooth bearing surfaces and assuring good rotation of the motor shaft when the motor is filled with water.

The way in which the above mentioned and other objects of the invention are realized will appear from the following detailed description of an embodiment of the invention, in which reference is made to the enclosed drawing, in which Fig. 1 is a longitudinal sectional view of a submersible electric motor designed for actuating a deep well pump, and Fig. 2 is a longitudinal section of a device provided for filling an insulating substance enclosing the stator windings into the motor.

Referring to Fig. 1 of the drawing, the submersible electric motor of the squirrel cage type is provided with a tubular casing 1, into which the laminated stator core 2 is installed. The stator windings 3 are arranged in the unlined grooves of the stator core 2, which grooves are not shown in the drawing. The wires of the stator windings 3, instead of a thick insulating coat as heretofore used for submersible electric motors, are coated with a thin insulation consisting of a silk strand wound thereon or such silk wound wire covered with a coating of varnish. It is therefore possible to insert into the grooves of the stator core 2 the length of winding which is demanded by the respective line voltage to which the motor is connected.

The stator grooves may be of the open type so as to improve and facilitate the insertion of the windings. There is no necessity of providing insulation linings in the stator grooves. One may, however, provide insulation linings, which consist of glass silk impregnated with varnish or a plastic material.

The motor casing 1 and the stator core 2 may be coated with a phosphate layer known in the art.

The stator windings 3 are connected to a three phase alternating current supply by means of a cable 5. A thermostatically controlled safety device 6 is provided between the stator windings and the cable 5, which is located directly adjacent the upper heads of the stator windings 3 and thereby is in heat conducting connection with the stator windings. The safety device 6 on one hand is operated by the electric current supplying the motor, and the other hand by the heat rising within the stator windings. When the motor is supplied by three phase alternating current the safety device 6 is connected to two or three phases, while it is connected to the main line when single phase alternating current is used for driving the motor.

A ring 15 is placed at the lower end of the motor casing 1, which ring may for instance be welded to the motor casing 1. The ring 15 is provided with threaded bores, into which screws 14 supporting the base cap 13 are inserted. A ring 19 is connected to the upper end of the motor casing 1, for instance by welding. The ring 19 is provided with threaded bores 20, into which screws not shown in the drawing may be inserted, by which screws the motor is combined with the submersible centrifugal pump.

Referring now to Fig. 2, the completed stator is provided with a mandrel 31 having at its lower end an inner surface of conical shape, the surface of the mandrel 31 being coated with a removable foil 32 consisting e. g. of triacetate or some other plastic material. The mandrel 31 has a diameter which is somewhat smaller than the stator core 2, so that a narrow annular gap is formed between the foil 32 of the mandrel 31 and the internal surface of the stator core 2. Upon its longitudinal axis, the mandrel 31 is provided with a bore 33, the surface of which is coated with a thin layer of, e. g., siliconaceous substances. A tube 34, which has a diameter equal to the motor shaft 8 (see Fig. 1) and to which a journal bearing 9 later on described in this specification is affixed, is fastened to the upper end of the mandrel 31. The journal bearing 9 is sealed against the upper front side of the mandrel 31 by means of a rubber packing ring 35.

The journal bearing 9 is supported by an upper terminal plate 37, a packing ring 36 being interposed between both these parts. The plate 37 is pressed against the upper front side of the motor casing 1 by means of screws 38, which are inserted into threaded bores 20 of the ring 19. The tube 34 extends through the plate 37 and at its upper end is provided with a thread, upon which a nut 39 connecting the tube 34 and the mandrel 31, the latter being connected with the tube 34, is screwed.

A rubber tubing 40, which is inserted into the tube 34 and guided through the bore 33 of the mandrel 31, is fixed at the lower conical end 41 of the bore 33 by means of a clamping shell 42, while the upper end of the rubber tubing 40 is clamped in the tube 34 by the conical end of the feeding tube 43 and by the nut 39.

The lower end of the motor casing 1 is closed by a terminal plate 44, upon which rubber plates 45, 46 are located and which is fixed by screws 47 threaded into the ring 15. The lower end of the mandrel 31 is provided with radial grooves 48, so that the rubber tubing 40 has free entry into the hollow spaces of the motor casing 1, in which hollow spaces the winding heads of the stator windings 3 are located.

The terminal plates 37 and 44, which are fitted into the motor casing 1, are provided with annular shoulders 37' and 44' covering the respective upper and lower ends of the motor casing 1. A short cylindrical nose 49 is attached to the lower end of the mandrel 31 and fitted into a deepening 50 of the plate 44, whereby the mandrel 31, as well as the tube 34 forming an upper continuation of the mandrel 31, are precisely centered in the motor casing 1.

The motor casing 1, upon being provided with the mandrel 31, is heated in a vacuum for several hours so as to completely expel its moisture, during which process the casing should be maintained at a temperature of approximately 50–60° C.

Thereupon, a fluid resinous substance is introduced into the rubber tubing 40 and, through the bore 33, reaches the lower end of the mandrel 31, wherefrom, after passing the radial grooves 48, it penetrates into the motor casing 1, filling the hollow space 4' near the lower winding heads, the hollow spaces of the stator grooves and the hollow space 4 near the upper winding heads and enclosing the thermostatically controlled safety device 6 and the junction of the cable 5. The insulations of the windings are simultaneously vacuum impregnated with this resinous substance. Air bubbles or pores in the windings are prevented by this method.

The substance filled into the motor is a resinous substance consisting of two components, such as substances composed essentially of aethoxylene, and baking at low temperature. Before introduction into the motor the resinous substance has a temperature of approximately 20° Celsius and when penetrating into the motor casing, which is heated to approximately 50–60° Celsius, becomes more fluid, so that a better penetration of the resinous substance into the windings is achieved. The fluid resinous substance also penetrates into the hollow space formed by the internal surface of the stator core 2 and the surface of the mandrel 31, the latter having a diameter somewhat smaller than the stator core 2. It will be seen therefrom that all metal parts located in the interior of the motor casing are enclosed by the resinous substance described and, in consequence thereof, are reliably protected against corrosion.

Upon introduction of the resinous substance the motor casing 1 is placed into a water tank 51, which is provided with a feed pipe 53 at its upper end and with a discharge pipe 52 at its lower end. The reaction heat rising during the baking process of the resinous substance and caused by chemical reaction is absorbed by the water in the tank 51, so that the baking temperature is limited to 40–50° Celsius. Since the resinous substance is self-baking and no fluid solvent evaporating during the introduction or baking process is contained in the resinous substance, there are no thermal stresses ocurring between the resinous substance and the metal parts of the motor, which might be caused by unlike coefficients of expansion. Upon baking, the resinous substance tightly adheres to the metal parts of the motor, so that no moisture is admitted to them. The adherence of the resinous substance may be improved by roughening or phosphate-treating the respective surfaces of the metal parts. Accordingly, the resinous substance forms a complete and corrosion-proof coat 4, 4' on the stator windings 3.

Submersible electric motors of the type mentioned are completely surrounded by water, and in their interior they contain a circulating water stream. The stator windings 3 are therefore steadily and reliably cooled, and the insulating resin is kept below softening temperature, so that its insulating properties are maintained for the entire life time of the motor.

Experiments, which were carried out, confirmed that stator winding wires provided with an insulation of the resinous substance mentioned are perfectly protected against injuries from water circulating in the motor or other liquids, such as benzine, oil etc. Even when submersed into water for several months' time or when subjected to heat, no penetration of water into the windings was observed.

Heretofore, the use of said aethoxylene resinous substances in the construction of electric machines for insulating the stator windings was prevented by the limited heat conductivity of these substances. Also when adding powderised quartz the improvement in heat conductivity achieved thereby does not exceed a certain degree and therefore is of little help. However, in the case of submersible electric motors of the water filled type, these disadvantages are of no concern, since the heat of the stator windings 3 is absorbed by the water circulating in the motor.

Aethoxylene resinous substances are therefore well adapted for the purpose described, while they are not suitable for ordinary electric motors.

The fluid aethoxylene resinous substance may be introduced into the motor in a different manner. The mandrel 31 is omitted in this case, so that the whole stator core is filled with the fluid resinous substance. The resinous substance filling the interior of the stator core 2 is removed by boring or turning after cooling down. In applying this modified method, the internal surfaces of the stator core 2 are given a most solid and durable insulation. A treatment of the above described manner is favoured by the mechanical properties of the baked aethoxylene resinous substance.

When the stator grooves are of the open type, the groove slots are closed by the aethoxylene resinous substance introduced into the motor. Instead, the groove slots may be closed by means of keys, which are made of like resinous substance, before said substance is introduced into the motor. Linings of the stator grooves as known in the art may be omitted in the construction according to the invention. They may, however, be provided in the stator grooves, in which case they should be made of a material promoting a firm adherence of the resinous substance, e. g. glass silk, which is impregnated with the resinous substance mentioned or with a similar varnish and therefore is adapted to form a tight connection with the aethoxylene resinous substance introduced into the motor.

The laminated core 7 of the rotor is provided with a squirrel cage winding and secured to the vertical motor shaft 8, the upper part of which is guided in the journal bearing 9, the lower part being guided in the journal bearing 10.

The upper journal bearing 9, which is completed when the resinous substance is introduced into the motor, comprises a shell made of like material, to which an admixture of graphite or of other materials providing for lubrication of the journal bearing containing the motor shaft 8 is added. The upper journal bearing 9 is permanently combined with the insulating resinous substance 4 enclosing the upper heads of the windings, which results in a further support and in an improved protection of the upper heads of the windings. The mandrel 31, which, by means of the plates 44 and 37 (see Fig. 2), is precisely centered relatively to the motor casing 1 during introduction of the fluid resinous substance, simultaneously provides for a central position of the journal bearing 9 relatively to the motor casing 1. Accordingly, there is no need of providing a separate casing for the journal bearing 9. A simplified construction in the described manner results in a decrease of manufacturing costs and represents a distinct technical improvement. Since the upper bearing 9 and the insulating resinous substance 4 are made of like material, both parts have like coefficients of expansion.

The lower bearing 10 of the motor shaft 8 is formed of a shell consisting of a resinous substance, to which a graphite admixture is added. The lower cylindrical portion 12 of the bearing 10, which is of greater diameter than its upper portion, is inserted in a cylindrical bore of the base-cap 13 of the motor casing, which base-cap 13, by means of screws 14, is fastened to a ring 15. In order to give the bearing 10 a firm support in the base-cap 13, it is preferable to cement the lower cylindrical portion 12 of the bearing 10 with the inside wall of the base-cap 13 by providing a layer of an adhesive substance between them, which consists of the same material as the resinous substance, of which the bearing 10 is made, so that a tight connection between both these parts is maintained.

The upper front of the bearing 10 at the same time forms a thrust bearing 17 of a thrust ring 18, which is secured to the motor shaft 8, hence the axial force of the motor shaft 8 is directly absorbed by the bearing 10.

The bearings 9, 10 and the thrust bearing 17 are required to have a smooth surface to insure a good rotation of the motor shaft when the motor is filled with water. As mentioned above, the bearings 9, 10 are therefore made of a resinous substance, to which graphite is admixed, amounting to, for instance, 40%–70% of their respective weights.

The upper end of the motor casing 1, which is combined with a deep well submersible pump not shown in the drawing, is closed by a ring 19, which is fixed to the motor casing 1 by means of pins or a spring ring through which ring the cable 5 is led into the motor. Bores 20 are provided in the ring 19 to take up screws not shown in the drawing, which are destined to combine the pump and motor unit.

The base-cap 13 forms a chamber 25, which is provided to admit the water circulating within the motor. The chamber 25 is closed by a screw 26, which consists of e. g. an insulating substance and is provided with a filter 30. When the motor is lowered into the well, the interior of the motor casing 1 automatically fills with water penetrating through the filter 30, which filter serves to prevent the entry of impurities contained in the well water filling the motor casing 1. This construction, by which the entry of water into the interior of the motor is allowed may be used without danger for a motor according to the invention, the interior of which is provided with the resinous substance mentioned, since, with the exception of the rotor 7 and motor shaft 8, which are protected by galvanic layers, no metal parts accessible to water are contained in the motor, so that well waters of average chemical properties may be used without causing corrosional injuries of the motor.

The continuous circulation of the water filling the interior of the motor is maintained owing to the centrifugal force of the rotor 7 and motor shaft 8, which water circulation at the same time serves to lubricate the bearings of the motor shaft 8. So as to improve the water circulation within the motor, longitudinal grooves 21 and 22 are provided in the upper journal bearing 9, and longitudinal grooves 23 in the lower bearing 10, while radial grooves 24 are provided in the thrust bearing 17 of the bearing 10. The chamber 25, by means of channels 27 and an annular chamber 28, is connected with a channel 29 extending between the lower bearing 10 and the insulating substance 4'. It will be seen therefrom that all bearings are reliably lubricated by the water circulating within the motor.

In the device according to Fig. 2 the mandrel 31 may be of solid shape without provision of the longitudinal bore 33. For the introduction of the resinous substance into the motor, a hose through which the fluid resinous substance is conducted into the stator core is connected to a container receiving the heated and fluid resinous substance, which container is subjected to slight overpressure during introduction of the resinous substance. The lower end of the hose extends through a bore of the lower terminal plate 44 so that the resinous substance is pressed up from below into the heated stator owing to the overpressure in the container. When the introduction of the resinous substance is finished, the hose is locked by means of clamps; the stator is placed into a cool water container in which it must remain for several hours until all reaction heat arising during the hardening process is eliminated and the stator has cooled down to normal medium temperature. Thereupon the mandrel 31 is removed and the motor may be assembled in the above described manner.

The invention is of importance for small submersible electric motors of external diameters of approximately 3½ inches, which are employed to drive deep well pumps located in narrow bore holes and therefore are required to be of a most compact construction. The main field of applying the above described invention is formed by submersible electric motors having a performance of approximately 0.25–10 H. P. and being connected to line voltages generally used, particularly by motors employed to drive house water plants.

The invention is not limited to the specific fields of application as described hereabove, it being understood that certain changes may be made in the invention and different embodiments may be made without departing from the scope thereof, and that all matter contained in the above described disclosure is intended to be interpreted as illustrative and not in a limiting scene.

We claim:

1. A submersible electric motor, comprising an elongated casing adapted to be filled with water, a laminated stator core mounted within said casing and having grooves formed therein, stator windings in said grooves, a body consisting of an insulating resinous mass and enclosing said windings, a motor shaft within said casing, two journal bearings located at opposite ends of said elongated casing and enclosing said shaft, said journal bearings consisting of the same insulating resinous mass as said body and being engaged and enclosed by said body, said journal bearings being firmly connected with said casing by said body, and a squirrel cage type rotor carried by said shaft and rotatable therewith, wherein said resinous mass consists essentially of ethoxyline resin.

2. A submersible electric motor, comprising an elongated casing adapted to be filled with water, a laminated stator core mounted within said casing and having grooves formed therein, stator windings in said grooves, a body consisting of an insulating resinous mass and enclosing said windings, a motor shaft within said casing, two journal bearings located at opposite ends of said elongated casing and enclosing said shaft, said journal bearings consisting of the same insulating resinous mass as said body and being engaged and enclosed by said body, said journal bearings being firmly connected with said casing by said body, and a squirrel cage type rotor carried by said shaft and rotatable therewith, wherein said journal bearings are cemented to the body by a substance consisting of the same mass as said body.

References Cited in the file of this patent

UNITED STATES PATENTS

| | | |
|---|---|---|
| 1,827,571 | Fiene | Oct. 13, 1931 |
| 1,875,207 | Apple | Aug. 30, 1932 |
| 2,400,891 | Sigmund | May 28, 1946 |

FOREIGN PATENTS

| | | |
|---|---|---|
| 871,963 | France | Jan. 29, 1942 |
| 1,034,523 | France | Apr. 8, 1953 |

OTHER REFERENCES

Publication: Electrical Manufacturing, July 1949, pages 78, 79, 80 and 81, entitled "Ethoxylines."